US012114093B1

(12) United States Patent
Pellikka et al.

(10) Patent No.: US 12,114,093 B1
(45) Date of Patent: Oct. 8, 2024

(54) CONTINUOUS IMAGE STITCHING DURING IMAGING (71) Applicant: Grundium Oy, Tampere (FI)

(72) Inventors: Matti Pellikka, Lempäälä (FI); Kimmo Alanen, Metsäkansa (FI)

(73) Assignee: Grundium Oy, Tampere (FI)

( * ) Notice: Subject to any disclaimer, the term of this patent is extended or adjusted under 35 U.S.C. 154(b) by 0 days.

(21) Appl. No.: 18/242,020

(22) Filed: Sep. 5, 2023

(51) Int. Cl.
*H04N 5/262* (2006.01)
*H04N 23/80* (2023.01)

(52) U.S. Cl.
CPC ........... *H04N 5/2624* (2013.01); *H04N 23/80* (2023.01)

(58) Field of Classification Search
CPC .............................. H04N 5/2624; H04N 23/80
USPC ........................................................... 348/79
See application file for complete search history.

(56) References Cited

U.S. PATENT DOCUMENTS

| | | | | |
|---|---|---|---|---|
| 10,102,226 B1* | 10/2018 | Cosic | .................. | G06F 16/5854 |
| 2011/0058014 A1* | 3/2011 | Yamashita | ......... | H04N 23/6811 |
| | | | | 382/284 |
| 2012/0105634 A1* | 5/2012 | Meidan | ............ | G08B 13/19689 |
| | | | | 382/103 |
| 2016/0088287 A1* | 3/2016 | Sadi | ........................ | H04N 5/265 |
| | | | | 348/43 |
| 2017/0038576 A1* | 2/2017 | Sasaki | .................... | H04N 5/265 |
| 2017/0347022 A1* | 11/2017 | Pettersson | ............ | H04N 23/698 |
| 2019/0037138 A1* | 1/2019 | Choe | .................... | H04N 23/698 |
| 2022/0191389 A1* | 6/2022 | Lei | .......................... | H04N 23/61 |
| 2023/0308599 A1* | 9/2023 | Heo | ...................... | H04N 5/2224 |
| | | | | 382/100 |

* cited by examiner

*Primary Examiner* — Amir Shahnami
*Assistant Examiner* — Jimmy S Lee
(74) *Attorney, Agent, or Firm* — Laine IP Oy (57) ABSTRACT

According to an aspect, there is provided an apparatus for performing the following. The apparatus obtains, periodically or regularly during imaging of an imaging target, images of different areas of the imaging target. At least some of the images overlap partially with each other. In response to detecting that an image and all images partially overlapping with said image have been obtained, the apparatus marks the image as completed. In response to detecting that a pre-defined number of images are marked as completed but not locked, the apparatus executes a partial image stitching process comprising: performing image stitching on non-locked images based on at least some obtained this far, locking stitched completed images and performing one or more actions. The one or more actions comprising outputting image information via at least one interface and/or storing the image information to a database accessible by a user and/or analysis device.

19 Claims, 8 Drawing Sheets

CONTINUOUS IMAGE STITCHING DURING IMAGING

FIELD

The invention relates to the field of image processing, especially to stitching of images.

BACKGROUND

Image stitching is a process of creating a seamless composite image from a set of images. The objective of image stitching is finding a transformation of pixel coordinates from the composite image to each individual image in order to be able to render the corresponding region in the composite image. The set of images to be stitched may correspond, for example, to a set of images acquired through scanning, e.g., using a digital microscope scanner. In typical image stitching methods, image acquisition is carried out to completion before the image stitching is initiated to ensure that optimal transformations for creating a seamless composite image can be derived. However, in some applications, it might be beneficial if some information on the stitched image could be obtained already during the image acquisition.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

DETAILED DESCRIPTION

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In the following, scalars are denoted with non-boldfaced italic lower-case letters, vectors are denoted with boldfaced non-italic lower-case letters and matrices are denoted with non-boldfaced non-italic upper-case letters.

Image stitching is a process of creating a seamless composite image from a set of images. Said set of images may be images representing and covering a certain scene or surface (e.g., a surface or area of a microscope slide). Said set of images may be partially overlapping with each other. Stitching may be needed in various applications such as in medical imaging, creating panorama images, satellite or aerial imaging, and in microscope scanning applications. The examples presented herein are related to microscope scanning applications, wherein multiple images captured from different positions on the slide need to be combined into a final image, i.e., a composite image.

Figure 1:
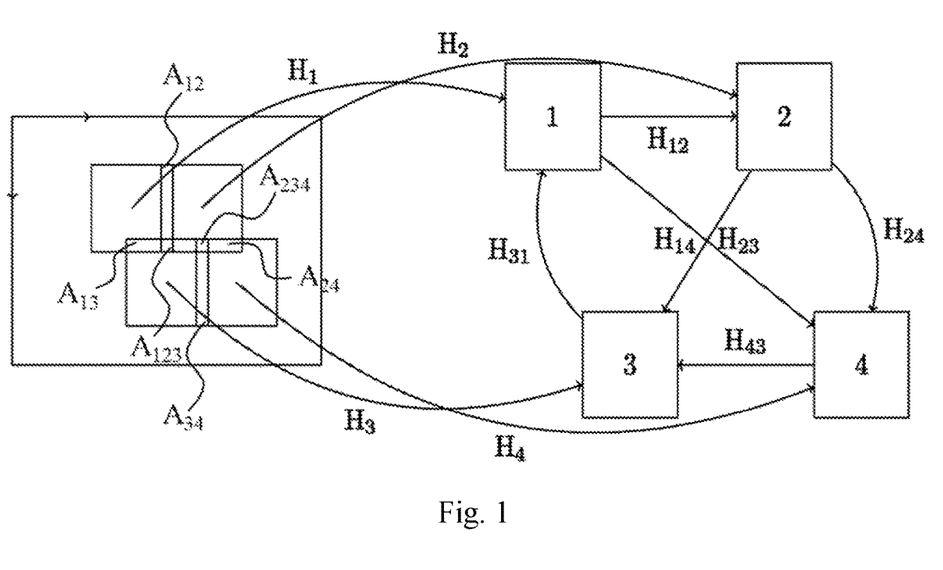
FIG. 1 illustrates exemplary transformations from a composite image to individual images.

Aim of an image stitching process is to find a transformation from the composite image to individual images in order to render the corresponding region in the composite image. FIG. 1 is a graph showing transformations from a composite image 100 to individual images 1, 2, 3, 4. As shown in FIG. 1, the individual images 1, 2, 3, 4 are partially overlapping images in the composite image. For example, the image 1 partially overlaps with the image 2. The overlapping area $A_{12}$ is shown in FIG. 1. Image 1 also overlaps with image 3, which is illustrated by the overlapping area $A_{13}$. Image 3 partially overlaps with the image 4, which is illustrated by the overlapping area $A_{34}$. Overlapping area $A_{123}$ describes partial overlap of the images 1, 2 and 3. Further, the image 3 partially overlaps with the image 2 (overlapping area $A_{23}$), and the image 2 partially overlaps with the image 4 (overlapping area $A_{24}$). Overlapping area $A_{234}$ describes partial overlap of the images 3, 4 and 5.

In FIG. 1, the transformation matrices $H_1$, $H_2$, $H_3$ and $H_4$ represent transformations between the composite image pixel coordinates and the pixel coordinates of the individual images 1, 2, 3 and 4, respectively. In general in image stitching, a transformation between a vector defining the composite image pixel homogenous coordinates x and a vector defining the pixel homogenous coordinates of an individual image x' has the form $$x'=Hx, \quad (1)$$

where H is a transformation matrix (e.g., $H_1$, $H_2$, $H_3$ or $H_4$). In general, here and in the following, a transformation matrix $H_i$ represents a transformation between the composite image pixel coordinates and the pixel coordinates of image i (i being a positive integer representing an image index). The vectors x' and x may, in general, have the forms $[x'\ y'\ z']^T$ and $[x\ y\ z]^T$, respectively, where x', y' & z' and x, y & z are x, y & z homogenous coordinates of an individual image and of the composite image, respectively, and 'T' indicates a transpose operation. In applications involving imaging/scanning a planar surface, the z & z' components may be equal to a constant (e.g., 1). Then, (x, y) and (x', y') represent a pixel location in the individual image and of the composite image, respectively.

In applications involving imaging/scanning a planar surface (e.g., in digital microscope scanner applications), similarity transformations may be considered sufficiently accurate models for the aforementioned transformations. Similarity transformations may be represented as invertible 3×3 matrices acting on homogeneous pixel coordinates. In other words, the equation (1) may have the following form in the case of a similarity transformation:

$$\begin{bmatrix} x' \\ y' \\ 1 \end{bmatrix} = \begin{bmatrix} a & b & c \\ -b & a & d \\ 0 & 0 & a \end{bmatrix} \begin{bmatrix} x \\ y \\ 1 \end{bmatrix}, \quad (2)$$

where x & y and x' & y' are the input and output pixel coordinates, respectively, a, b, c and d are parameters of the similarity transformation. Another parametrization for the matrix of (2) would be a=s cos φ and b=s sin φ, where's is the scale change of the image and the φ is the rotation angle of the image. With both parametrizations, c and d denote the horizontal and vertical translations of the image.

In addition to the transformation matrices $H_1$, $H_2$, $H_3$ and $H_4$ representing transformations between the composite image pixel coordinates and the pixel coordinates of the individual images, FIG. 1 also shows transformation matrices $H_{12}$, $H_{14}$, $H_{23}$, $H_{24}$, $H_{31}$, & $H_{43}$ which represent transformations between pairs of individual partially overlapping images. In general, here and in the following, a transformation matrix $H_{ij}$ represents a transformation from coordinates of image i and to coordinates of image j (i & j being positive integers representing image indices). The right side of FIG. 1 may called a pairwise registration graph.

Conventional methods for image stitching comprise two phases. In the first phase, a pairwise registration between the newest scanned image and its previously scanned neighboring images is performed during the scanning (or following the scanning). For example, in the pairwise registration, the transformations $H_{ij}$ may be found together with a set of n feature point correspondences or pairs $\{x_{ij}^n \leftrightarrow x_{ji}^n\}$ on the overlapping areas to determine a transformation between the pixel coordinates of the image pair, for example between images 1 and 2 in FIG. 1. Here, the point $x_{ij}^n$ refers to pixel coordinates of a feature point on the image i, such as a corner feature, and the point $x_{ji}^n$ to feature point in image j that should be same point on the scanned object. The found transformation $H_{ij}$ is consistent with the found feature point correspondences, that is, $x_{ji}^n = H_{ij} x_{ij}^n$ approximately holds for each feature point n. A robust estimation method, such as random samples consensus (RANSAC), may be used to find the transformation together with a set of true point correspondences. Other examples of robust estimation methods are the derivatives of RANSAC, e.g., maximum likelihood estimator sample consensus (MLESAC) and maximum a posteriori sample consensus (MAPSAC), and the family of M-estimators. Pairwise transformations constitute edges in a connectivity graph, which in the conventional method is a simple graph. Nodes of the graph represent the unknown transformations from the composite image pixel coordinates to pixel coordinates of the individual images.

The pairwise registration is not sufficient to produce a seamless composite image. If the images are tiled together one by one, small errors in the pairwise registrations may easily accumulate, creating noticeable misalignment. Therefore, methods to solve for globally consistent registrations are typically needed. Thus, in the second phase, a global alignment is performed once all the images have been scanned and all the pairwise registrations have been done. In this phase, an optimal transformation from the composite image pixel coordinates to pixel coordinates of each individual image is found by minimizing the transformation error between the feature point correspondences in the connectivity graph formed by the transformations. Here, the nodes of the connectivity graph are the images, and the graph edges of the connectivity graph are the transformations between the images. In other words, the transformations should satisfy as well as possible the point correspondences found during the first phase. The solved transformations may then be used in image warping to render the composite image. For example when similarity transforms are employed, the parameters a, b, c and d of the matrices $H_i$ are found in the global alignment phase.

As mentioned above, some of the embodiments to be discussed below relate in particular image stitching for microscope scanning applications. In a digital microscope (slide) scanner for performing scanning of microscope slide in parts and performing image stitching on those partial images, more images become available for processing as the scanning of the digital microscope scanner proceeds. The information from the new images may have an effect on the decision what would be the optimal transformations to create the seamless composite image. However, it would be beneficial in some applications to be able to fix the transformations of the already scanned images as soon as possible, to be able to render their part in the composite image and send the final image data for further analysis, for example on a remote server. The embodiments relate to performing image stitching in parts while the scan is still in progress, without affecting the image quality by introducing additional stitching artefacts.

To facilitate the subsequent discussion of embodiments where image stitching is performed while the scanning is in progress (so-called stream stitching), a standard image stitching method where all the images are scanned before performing the image stitching is discussed in the following in detail.

Figure 2:
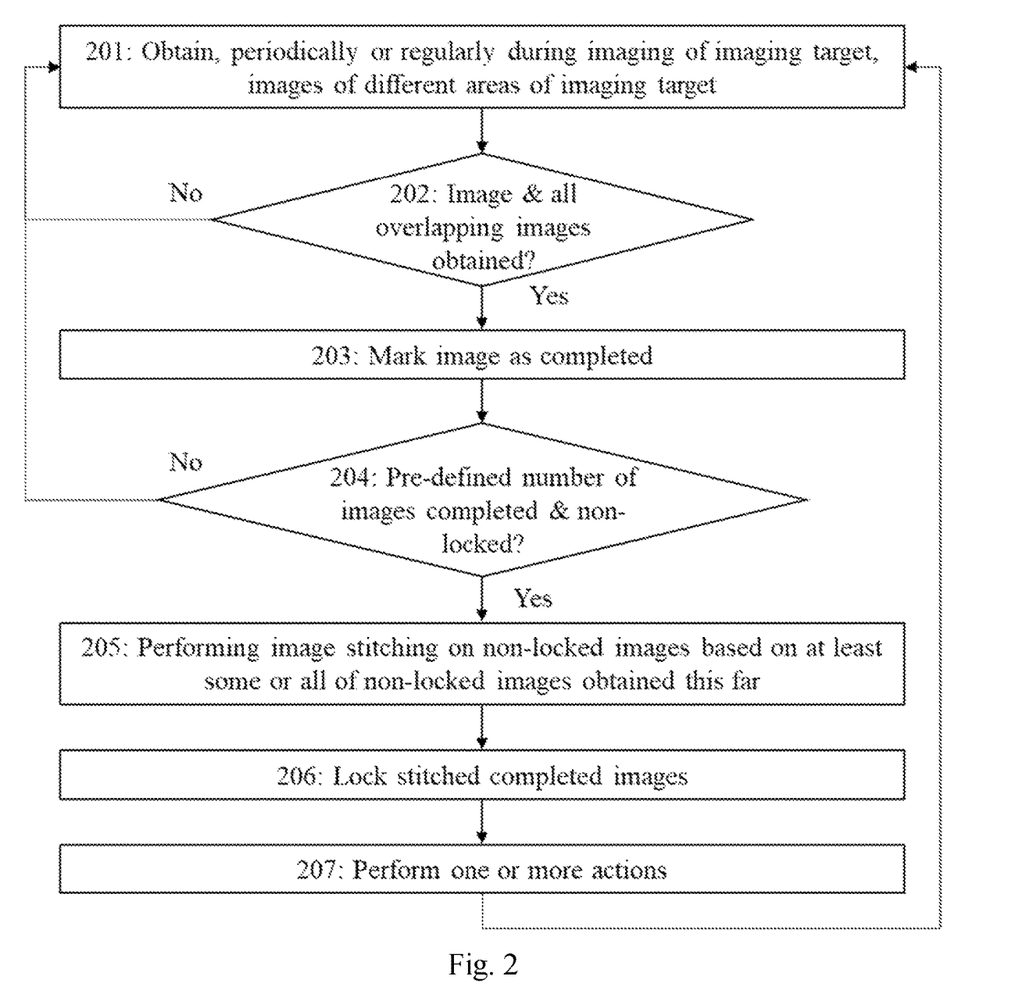
FIGS. 2 to 7 illustrate processes according to some embodiments.

FIG. 2 illustrates a process according to embodiments for performing image stitching. The illustrated processes of FIG. 2 may be performed by an apparatus (e.g., an imaging device or a computing device thereof or connected thereto) for performing imaging of an imaging target or an apparatus communicatively connected to said apparatus for performing imaging. The imaging device may be any digital device comprising at least one digital camera and/or at least one digital scanner. In some embodiments, the illustrated processes of FIG. 2 may be performed by an apparatus (e.g., a digital microscope (slide) scanner or a computing device thereof) for performing image scanning of an imaging target or an apparatus communicatively connected to said apparatus for performing image scanning. The term "imaging" as used here in the following may correspond, at least in some embodiments such as ones involving a digital microscope scanner, to (image) scanning. In the following, the entity performing the process of FIG. 2 is called an apparatus for simplicity.

Referring to FIG. 2, the apparatus obtains, in block 201, periodically or regularly during imaging of an imaging target, images of different areas of the imaging target. Here, at least some of the images overlap partially with each other (similar to as shown in FIG. 1). The imaging may correspond to image scanning. The scanning may be performed according to a pre-defined scanning pattern (e.g., a raster scan or a spiral scan) to cover a pre-defined scanning area (e.g., a 15 mm×15 mm scanning area). The scanning locations (i.e., central points of the scanned images) may form, for example, a two-dimensional (regular) rectangular or a two-dimensional (regular) hexagonal grid. In some embodiments, the imaging target may be a microscope slide (comprising a sample) or a part thereof.

In some embodiments, the obtaining of the images in block 201 may comprise or correspond to taking the images of the imaging target by the apparatus (being, here, the imaging device such as a microscope slide scanner). Alternatively, the obtaining of the images in block 201 may comprise or correspond to receiving the images of the imaging target from another device. For example, if the apparatus carrying out the process of block 201 is a computing device communicatively connected to the imaging device, the obtaining of the images in block 201 may comprise or correspond to receiving the images of the imaging target from the imaging device while the imaging (e.g., scanning) is in progress. To give another example, if the apparatus carrying out the process of block 201 is a computing device forming a part of the imaging device, the obtaining of the images in block 201 may comprise or correspond to receiving the images of the imaging target from an imaging module of the imaging device.

In some embodiments where the apparatus is a digital microscope slide scanner or a part thereof and the imaging target is a slide or a part thereof, the obtaining in block 201 may comprise, when the slide is inserted into the digital microscope slide scanner, scanning sequentially a plurality of pre-defined scanning subareas to form the images of the different areas of the slide. Here, the plurality of scanning subareas may overlap partially and form together a scanning area of the digital microscope slide scanner.

In response to detecting, during the obtaining of the images in block 201, that an image and all images partially overlapping with said image have been obtained in block 202, the apparatus marks, in block 203, the image as completed. In other words, the apparatus stores the information that the given image has been completed to an internal and/or external memory. In general, the apparatus may maintain information on the status of the scanned images (and images to be scanned) in said internal and/or external memory. Whether or not a particular image has been completed may be detected based on, in addition to the images obtained this far, the pre-defined imaging area defined for the imaging of the imaging target (or the pre-defined scanning area defined for the scanning of the imaging target). Namely, it may be determined based on the pre-defined imaging area which of the obtained images (if any) are located at the edges of the imaging area and thus have fewer neighboring (i.e., overlapping) images compared to the centrally located images.

The check of block 202 may be performed after each newly obtained image or after n new images have been obtained (n being a positive integer larger than one). In response to detecting, during the obtaining of the images in block 201, that no new set of an image and all images partially overlapping with said image (i.e., no new "complete" set of images) has been obtained in block 202, the apparatus may simply continue the scanning process as normal (i.e., the process may proceed back to block 201).

In response to detecting, during the obtaining of the images in block 201, that a pre-defined number of images are marked as completed while not being defined as locked in block 204, the apparatus executes, in blocks 205 to 207, a partial image stitching process.

In some embodiments, the apparatus may trigger the execution of the partial image stitching process (i.e., blocks 205 to 207) also in response to detecting a completion of the imaging of the imaging target in block 204 (even if the pre-defined number of images have not been marked as complete while not being defined as locked). This may apply especially if the total number of images in a given imaging or scanning pattern is not divisible by said pre-defined number for triggering the partial image stitching process.

The pre-defined number of block 204 may be at least smaller than a total number of images for fully imaging the imaging target. In some embodiments, the pre-defined number of block 204 may be equal to or smaller than a half of the total number of images for fully imaging the imaging target. In further embodiments, the pre-defined number of block 204 may be equal to or smaller than a third or a fourth of the total number of images for fully imaging the imaging target.

The check of block 204 may be performed after marking of each newly completed image. In response to detecting, during the obtaining of the images in block 201, that the pre-defined number of images are not marked as completed while not being defined as locked in block 204, the apparatus may simply continue the scanning process as normal (i.e., the process may proceed back to block 201).

As a part of the partial image stitching process, the apparatus performs, in block 205, image stitching on non-locked images based on at least some or all of images obtained this far. The end result of the image stitching of block 205 comprises one or more transformations from a composite image to one or more completed images, respectively. The one or more transformations may be defined, e.g., as one or more respective transformation matrices $H_i$, where i is an image index. The end result of the image stitching of block 205 may comprise also, respectively, one or more transformations from a composite image to one or more non-completed images (though these images will not be locked as described below for the completed images).

Similar to the conventional image stitching discussed above, the image stitching in block 205 may comprise at least performing alignment for the non-locked images. The alignment may be based on results of pairwise registration for said at least some or all of images obtained this far. In this phase, an optimal transformation from the composite image pixel coordinates to pixel coordinates of each individual image obtained this far is found by minimizing the transformation error between the feature point correspondences in the connectivity graph formed by the transformations. Said optimal transform for the individual image i may correspond to the transformation matrix $H_i$ (as depicted, e.g., in FIG. 1). The pairwise registration which precedes the (partial) alignment may form a part of the image stitching of block 205 or it may be performed at an earlier stage of the process (e.g., directly following the obtaining of a given image) as will be discussed also in connection with FIGS. 3 & 4. The alignment performed in connection with embodiments may be called partial alignment (as opposed to global alignment) as only some of the images of the whole imaging (or the whole scan) are aligned at a given time. The pairwise registration and the (partial) alignment are discussed in further detail in connection with FIGS. 3 and 4.

In some embodiments, the performing of the image stitching in block 205 may be based on all images of the imaging target obtained this far comprising any available non-completed non-locked images of the imaging target, any available completed non-locked images of the imaging target, any available non-completed locked images of the imaging target and any available completed locked images of the imaging target. Here, any available non-completed locked images of the imaging target may correspond to zero or more reference images which are locked automatically as soon as they are obtained (as will be described in further detail below).

Following the image stitching in block 205, the apparatus locks, in block 206, stitched completed images for preventing changing of the stitched completed images during subsequent image stitching rounds. In other words, the apparatus at least stores the information that the given image has been locked to the internal and/or external memory. It should be noted that the stitched completed images may still take part in subsequent (partial) image stitching rounds (i.e., they may influence the image stitching performed on other images) but they may themselves not be adjusted during the image stitching. The non-completed images which took part in the image stitching in block 205 are not locked.

In some embodiments, the apparatus may, in response to obtaining an initial image of the imaging target in block 201, define said initial image as locked. In other words, the initial or first image obtained in block 201 may be considered locked even before any image stitching is performed by the apparatus and thus does not need to be locked in block 206 following the image stitching. The initial image may be considered to a reference image. In other embodiments, the apparatus may, in response to obtaining an nth image of the imaging target in block 201, define said nth image as locked in an analogous manner, where n is a positive integer smaller than or equal to the total number of images of the imaging process.

As a final step of the partial image stitching process, the apparatus performs, in block 207, one or more actions comprising at least one of outputting image information comprising at least information on most recently locked images via at least one interface or storing the image information comprising at least the information on the most recently locked images to a database accessible by a user device and/or by an analysis device. In other words, the image information is either displayed to a user or rendered available for further analysis and/or for requests from the user. Said information on most recently locked images may comprise, for example, the most recently locked individual images themselves, at least one composite image formed or generated based at least on the most recently locked images and/or image stitching related information concerning the locked individual images and/or the at least one composite image (e.g., n feature point correspondences or pairs $\{x_{ij}^n \leftrightarrow x_{ji}^n\}$ of pairwise registration and/or transform matrices $H_{ij}$ and/or $H_i$).

In some embodiments where the one or more actions of block 207 comprise at least the outputting via the at least one interface, the at least one interface may comprise at least one of: interface an for connecting to the Internet, a user interface for displaying the image information to the user via a display of the apparatus or a display communicatively connected to the apparatus or an interface for connecting to a local or remote server for further analyzing the image information (and/or for displaying the image information to a user). The display may be a display of the imaging device (being, e.g., the digital microscope scanner).

In some embodiments where the one or more actions of block 207 comprise at least the storing of the image information to the database, the database may be a database accessible (by the apparatus and/or by the user device and/or by the analysis device) via at least one wired and/or wireless communication network and/or via at least one wired and/or wireless communication link. The database may be an internal database of the apparatus or an external database.

Figure 3:
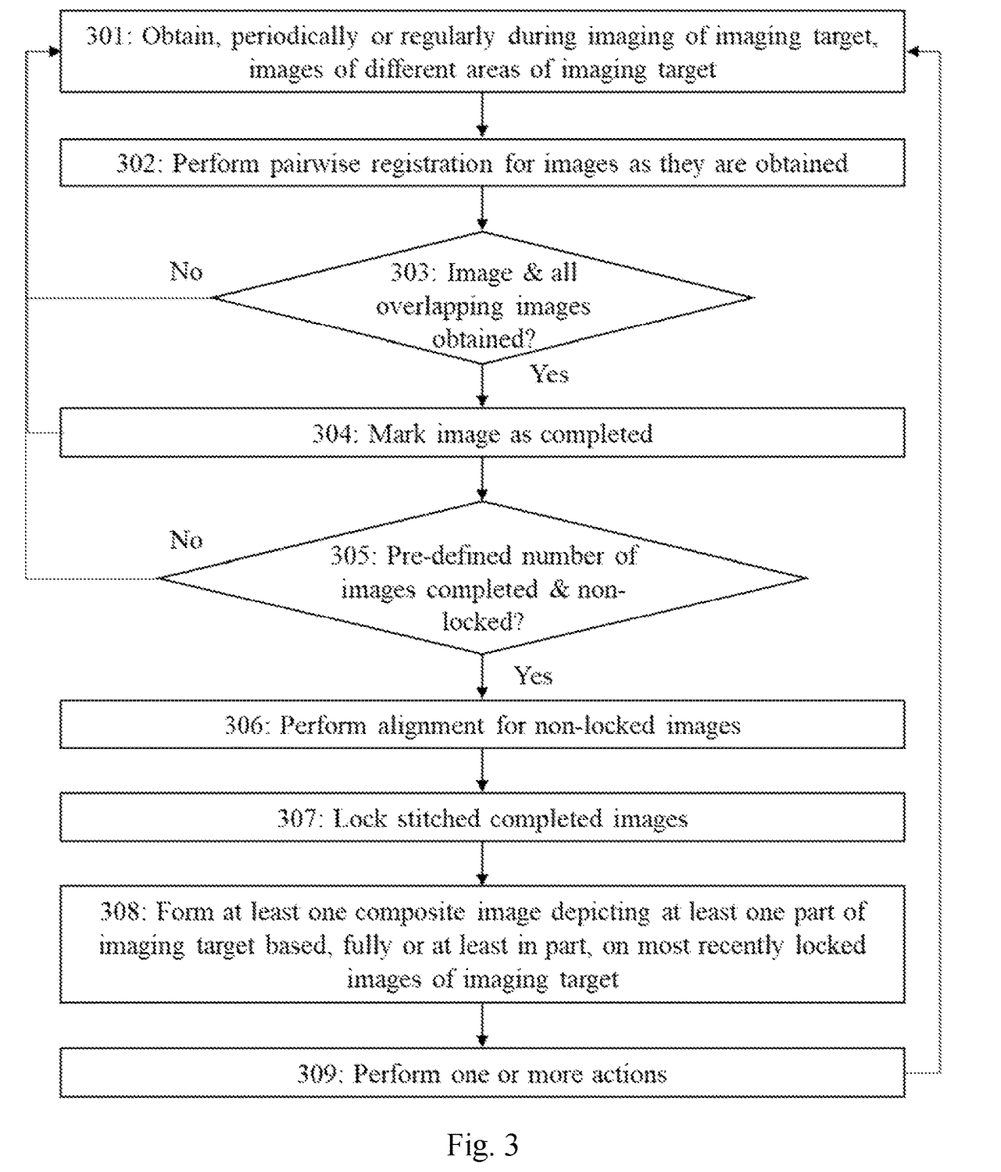

FIG. 3 illustrates another process according to embodiments for performing image stitching. The illustrated processes of FIG. 3 may be performed by an apparatus (e.g., an imaging device or a computing device thereof) for performing imaging of an imaging target or an apparatus communicatively connected to said apparatus for performing imaging. The imaging device may be any digital device comprising at least one digital camera and/or at least one digital scanner. In some embodiments, the illustrated processes of FIG. 3 may be performed by an apparatus (e.g., a digital microscope scanner or a computing device thereof) for performing image scanning of an imaging target or an apparatus communicatively connected to said apparatus for performing image scanning. In the following, the entity performing the process of FIG. 3 is called an apparatus for simplicity.

The process of FIG. 3 corresponds, to a large extent, to the process of FIG. 2. Namely, blocks 301, 303 to 305, 307 to 308 may correspond fully to blocks 201 to 204, 206, 207 of FIG. 2 and thus not discussed here for brevity.

The process of FIG. 3 shows explicitly the two steps relating to image stitching: pairwise registration (block 302) and (partial) alignment (306). In FIG. 3, the apparatus performs in block 302, during the obtaining of the images in block 301, pairwise registration for the images as they are obtained. The pairwise registration may be performed (or updated) after the obtaining of each new image. Alternatively, the pairwise registration may be performed (or updated) after obtaining n new images, where n is an integer larger than one.

The pairwise registration in block 302 may be performed similar to conventional image stitching. Only said at least some of non-locked images obtained this far take part in the pairwise registration, as opposed to all images forming the complete imaging image set (e.g., a complete scan). Thus, the apparatus may determine, in block 302, for each new pair of images (i, j), a transformation matrix $H_{ij}$ and a set of n feature point correspondences or pairs $\{x_{ij}^n \leftrightarrow x_{ji}^n\}$ on the overlapping areas to determine a transformation between the pixel coordinates of the pair of images, where n is a positive integer corresponding to a feature point index. Here, the equation $x_{ji}^n = H_{ij} x_{ij}^n$ may hold for each of the feature points n, at least approximately (i.e., within pre-defined limits). The transformation matrix $H_{ij}$ and the set of n feature point correspondences or pairs $\{x_{ij}^n \leftrightarrow x_{ji}^n\}$ may be called the pairwise registration information of the image pair (i, j). For example, assuming that images are obtained in the order i=1, 2, 3, . . . , if a new image with an index i=5 is obtained in block 201, the apparatus may determine, in block 202, for each new pair of images (5, j), a transformation matrix $H_{5j}$ and a set of n feature point correspondences or pairs $\{x_{5j}^n \leftrightarrow x_{j5}^n\}$ on the overlapping areas, where the index j has values j∈{1, 2, 3, 4}. Once the pairwise registration in block 302 is complete, the found transformations $H_{ij}$ form a graph similar to FIG. 1, where the nodes of the graph are the images, and the graph edges are the transformations between the images.

Steps relating to blocks 303 to 305 may be carried out similar to as described in connection with FIG. 2. Also, similar to FIG. 2, in response to detecting, during the obtaining of the images in block 301, that a pre-defined number of images are marked as completed while not being defined as locked in block 305, the apparatus executes, in blocks 306 to 308, a partial image stitching process. Namely, the apparatus performs, in block 306, alignment for non-locked images based on at least some or all images obtained this far and the results of the pairwise registration (block 302). The alignment performed in block 306 may be called partial alignment, as opposed to global alignment performed in conventional image stitching methods, as only a part of the images of the total imaging image set (e.g., a complete scan) are involved.

In the partial alignment phase of block 306, the transformations $H_i$ from the pixel coordinates of the composite image to the pixel coordinates of image i are found by finding the best compromise within the found pairwise point correspondences $\{x_{ij}^n \leftrightarrow x_{ji}^n\}$. While in global alignment carried out in connection with conventional image stitching, the image index i gets values corresponding to all values of i defined in the total imaging image set (e.g., a complete scan), in partial alignment, the image index i gets values corresponding only to a subset of all values of i for the total imaging image set (e.g., a complete scan). This subset for values of i corresponds to available completed non-locked images.

In practice, the partial alignment in block 306 may be carried out by solving a linear optimization problem defined as $$\min_{\{H_i\}} \sum_i \sum_j \sum_n \|H_i x_{ij}^n - H_j x_{ji}^n\|^2, \quad (3)$$

where both of the image indices i and j may obtain values corresponding to all available images, that is, the sums over image indices i and j are both sums over all available images. The sum over the feature point index n may be calculated over all available feature points. Assuming that the transformation are similarity transformations and thus the transformation matrices H have the form of (2), the problem of (3) may be rearranged to $$\min_{\{h\}} \|Ah\|^2, \quad (4)$$

where h is a stacked column vector of the parameters $a_i$, $b_i$, $c_i$ and $d_i$ of the transformations $H_i$ having the form of (2). The non-zero elements of the sparse matrix A consist of the feature point coordinates. By construction, the null space of A has the dimension of the number of parameters in a transformation $H_i$, i.e., four. In other words, at least one transformation needs to be fixed as the reference for the composite image coordinate system. We can divide the expression Ah into blocks $$Ah = \begin{bmatrix} A_{11} & A_{12} \\ A_{21} & A_{22} \end{bmatrix} \begin{bmatrix} h_1 \\ h_2 \end{bmatrix}, \quad (5)$$

where $h_1$ corresponds to the known transformations of the locked images while $h_2$ corresponds to the unknown transformations of the non-locked images. Thus, $h_1$ may be considered fixed while $h_2$ is to be solved. Then, the minimization problem of (4) may be written as $$\min_{\{h_2\}} \|A_{21} h_1 + A_{22} h_2\|^2. \quad (6)$$

Equation (6) has a unique solution:

$$h_2 = (A_{22}^T A_{22})^{-1} A_{22}^T A_{21} h_1 \quad (7)$$

As the vector $h_2$ comprises the parameters $a_i$, $b_i$, $c_i$ and $d_i$ of the transformation matrices $H_i$ having the form of (2) for all (available) values of i apart from the already fixed transformations of the locked images, the original equation (3) is fully solved.

Once the partial alignment of block 306 is complete, the apparatus locks, in block 307, all the participating completed images (while participating non-completed images stay non-locked), similar to as described in connection with FIG. 3.

Following the locking, the apparatus forms, in block 308, at least one composite image depicting at least one part of the imaging target based, fully or at least in part, on the most recently locked images of the imaging target. The forming may be further based on previously locked images. The at least one composite image may be of a pre-defined size. The forming of the at least one composite image in block 308 may be based on the results of the pairwise registration and the results of the partial alignment. The full composite image fully covering the imaging target may be formed based on the smaller composite images formed during multiple executions of block 308.

In some embodiments, the forming of the at least one composite image in block 308 may comprise transforming results of the pairwise registration for newly locked images to a reference image coordinate system based at least on results of the partial alignment. Said results of the pairwise registration (equally called pairwise registration information) may comprise at least the pairwise matched points $\{x_{ij}^n \leftrightarrow x_{ji}^n\}$ and transformation matrices $H_{ij}$ while said results of the partial alignment may comprise at least the transformation matrices $H_i$. The reference coordinate system may be, for example, the coordinate system of the initial image of the imaging process with i=1 (i.e., the image which is obtained first in block 301). As was mentioned above, the initial image may be considered locked automatically (i.e., it is not locked in block 307). With this choice of the reference coordinate system, the transformation in block 308 may comprise specifically transforming pairwise matched points $\{x_{ij}^n \leftrightarrow x_{ji}^n\}$ and transformation matrices $H_{ij}$, respectively, according to $$x_{ij}^n \rightarrow H_1 H_i^{-1} x_{ij}^n \text{ for all neighbors } j \text{ of } i, \quad (8)$$

$$H_{ij} \rightarrow H_{ij} H_i H_1^{-1} \text{ for all neighbors } j \text{ of } i. \quad (9)$$

In other words, the pairwise registration information of a given image i is updated as if it belonged to the initial (reference) image (i=1). This means effectively fusing all the locked nodes (corresponding to locked images) to a single node (i.e., to a composite image) in the pairwise registration graph and updating the graph edges accordingly. At least one composite image may be formed based on the updated pairwise registration information of the most recently locked images of the imaging target. An example of this operation is further discussed in connection with FIG. 4.

While in the above example the reference coordinate system was selected to be the coordinate system of the initial image (i=1), it is obvious that other reference coordinate systems may also be chosen. For example, in other embodiments, mth obtained image (i=m) may be considered automatically locked and the transformation of block 308 may comprise specifically transforming pairwise matched points $\{x_{ij}^n \leftrightarrow x_{ji}^n\}$ and transformation matrices $H_{ij}$, respectively, according to $$x_{ij}^n \rightarrow H_m H_i^{-1} x_{ij}^n \text{ for all neighbors } j \text{ of } i, \quad (10)$$

$$H_{ij} \rightarrow H_{ij} H_i H_m^{-1} \text{ for all neighbors } j \text{ of } i. \quad (11)$$

Here, m may be any positive integer smaller than or equal to the total number of images to be imaged. In some embodiments, the mth image may be an image forming a part of an initial batch of images taking part in the initial image stitching round.

In some embodiments, block 308 may be omitted.

In some alternative embodiments, the apparatus may form or generate a single reference transform matrix $H_i$ encompassing all the locked images based on the transformation of (8) or (10). This reference matrix $H_i$ may be used for calculating the transformation matrices $H_i$ for non-locked images, instead of using equations (3)-(7) as described above, in some alternative embodiments.

Similar to FIG. 2, the apparatus performs, in block 309, one or more actions comprising at least one of: outputting image information comprising at least information on most recently locked images via at least one interface or storing the image information comprising at least the information on the most recently locked images to a database accessible by a user device and/or by an analysis device. However, here the image information may comprise at least the transformed results of the at least one composite image formed in block 308.

Figure 4:
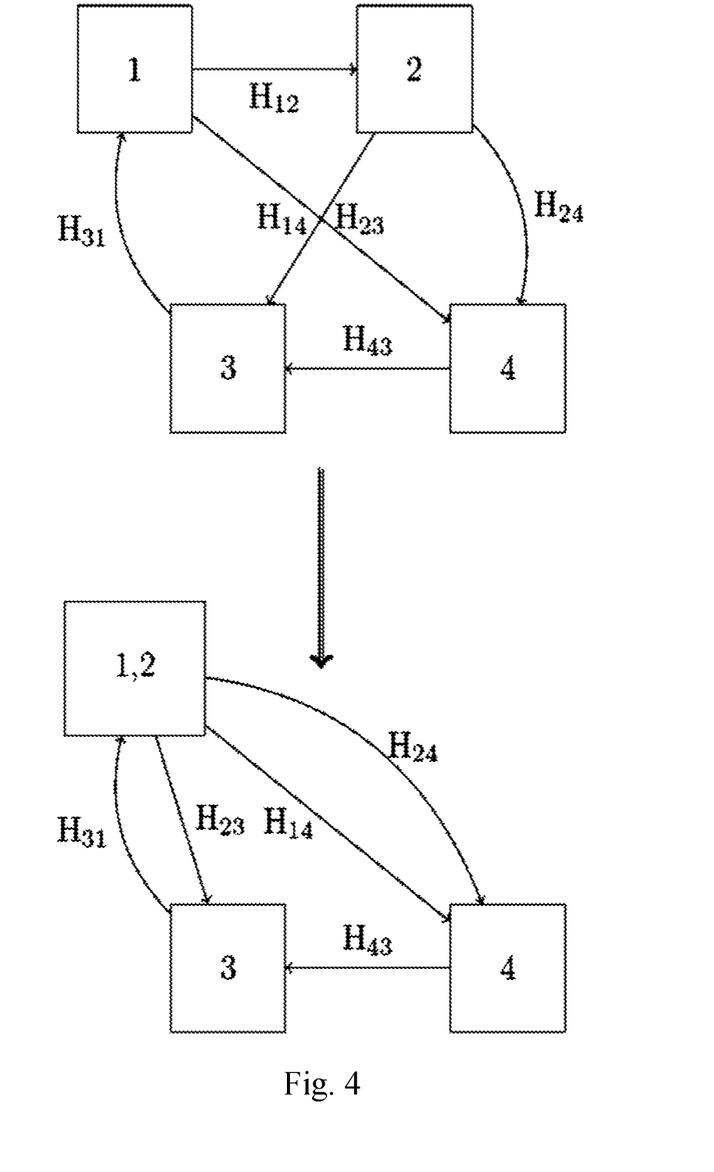

FIG. 4 illustrates an example of transforming results of the pairwise registration (i.e., the pairwise matched points $\{x_{ij}''\leftrightarrow x_{ji}''\}$ and transformation matrices $H_{ij}$) for newly locked images to a reference image coordinate system of reference image 1 401 and forming a composite image based on the transformation, as described above in connection with block 308 of FIG. 3. The top part of FIG. 4 shows a pairwise registration graph of four images 1 to 4, similar to the right side of FIG. 1, while the bottom part of FIG. 4 shows the same pairwise registration graph after the transformation. Specifically, in the bottom part of FIG. 4, images 1 and 2 have been fused to a single composite image 1,2. The graph edges are also updated accordingly.

Figure 5:
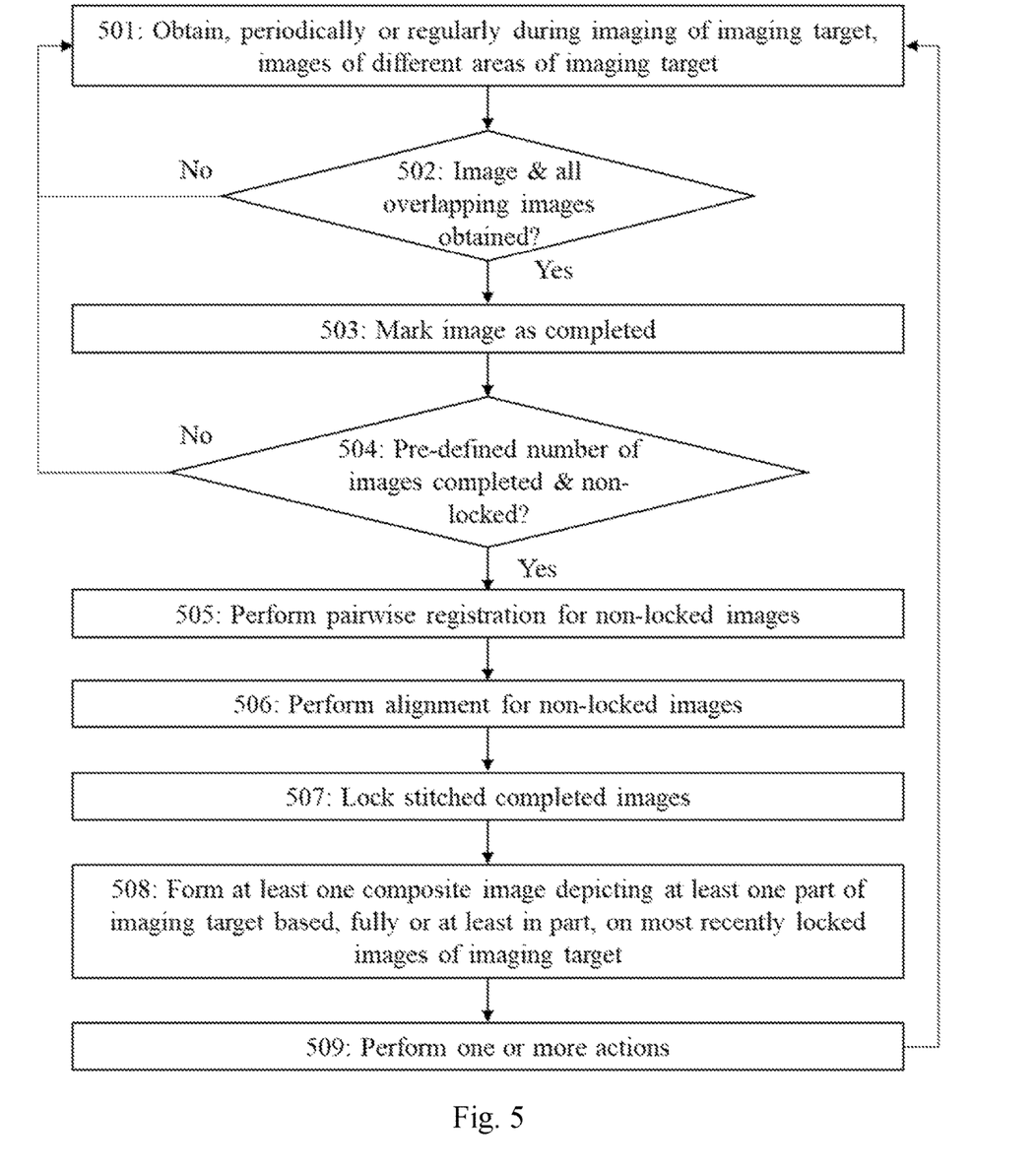

FIG. 5 illustrates another process according to embodiments for performing image stitching. The illustrated processes of FIG. 5 may be performed by an apparatus (e.g., an imaging device or a computing device thereof) for performing imaging of an imaging target or an apparatus communicatively connected to said apparatus for performing imaging. The imaging device may be any digital device comprising at least one digital camera and/or at least one digital scanner. In some embodiments, the illustrated processes of FIG. 5 may be performed by an apparatus (e.g., a digital microscope scanner or a computing device thereof) for performing image scanning of an imaging target or an apparatus communicatively connected to said apparatus for performing image scanning. In the following, the entity performing the process of FIG. 5 is called an apparatus for simplicity.

The process of FIG. 5 corresponds to a variation of the process of FIG. 3. Unless other explicitly noted, any of the features discussed in connection with FIG. 3 (and consequently also FIG. 2) may apply, mutatis mutandis, also for the process of FIG. 5. Blocks 501 to 504, 506 to 509 of FIG. 5 may correspond fully to blocks 301, 303 to 309 of FIG. 3.

The only difference between the process of FIG. 5 and the process of FIG. 3 lies in the timing of the pairwise registration step. Namely, while in the process of FIG. 3, the pairwise registration was performed directly following the obtaining of new images, in the process of FIG. 5, the pairwise registration is performed, in block 505, in response to detecting, during the obtaining in block 501, that a pre-defined number of images are marked as completed while not being defined as locked in block 504. Specifically, the apparatus performs, in block 505, pairwise registration for at least some of non-locked images obtained this far. The pairwise registration is still performed before the partial alignment (block 506).

The pairwise registration in block 505 may be performed similar to as discussed above in connection with block 302 of FIG. 3. Thus, the apparatus may determine, in block 505, for each new pair of images (i, j) (i.e., each pair which has not yet been through pairwise registration), a transformation matrix $H_{ij}$ and a set of n feature point correspondences or pairs $\{x_{ij}''\leftrightarrow x_{ji}''\}$ on the overlapping areas to determine a transformation between the pixel coordinates of the pair of images. Here, the equation $x_{ji}''=H_{ij}x_{ij}''$ may hold for each of the feature points n, at least approximately (i.e., within pre-defined limits).

Figure 6:
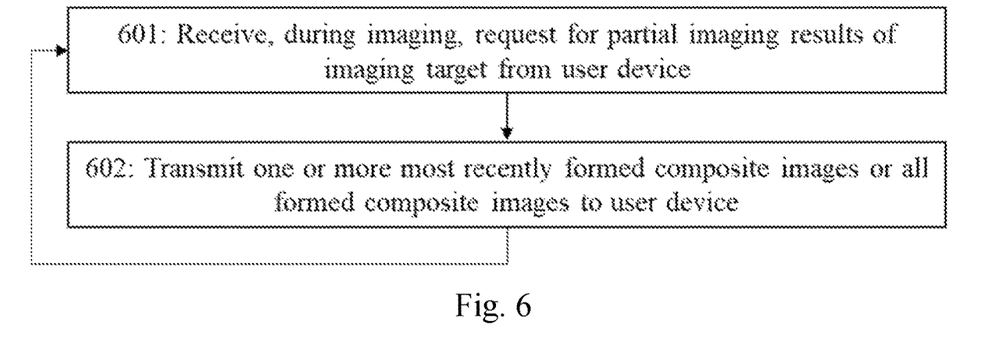

FIG. 6 illustrates a process according to embodiments which may be carried out in parallel with imaging and image stitching. Similar to FIGS. 2 to 5, the illustrated processes of FIG. 6 may be performed by an apparatus (e.g., an imaging device or a computing device thereof) for performing imaging of an imaging target or an apparatus communicatively connected to said apparatus for performing imaging. The imaging device may be any digital device comprising at least one digital camera and/or at least one digital scanner. In some embodiments, the illustrated processes of FIG. 6 may be performed by an apparatus (e.g., a digital microscope scanner or a computing device thereof) for performing image scanning of an imaging target or an apparatus communicatively connected to said apparatus for performing image scanning. In the following, the entity performing the process of FIG. 6 is called an apparatus for simplicity.

FIG. 6 depicts a process which may be carried out during the imaging (or specifically during the obtaining of images in any of blocks 201, 301, 501 of FIGS. 2, 3 and 5). Thus, the process of FIG. 6 may be carried out in parallel with any of the processes of FIGS. 2, 3 and 5. As was described in connection with above embodiments, the apparatus may store image information comprising at least information on the most recently locked images to a database accessible by a user device and/or by an analysis device. As discussed in connection with FIG. 3, the image information may comprise composite image(s) depicting different part(s) of the imaging target. FIG. 6 depicts a process for providing said composite image(s) to a user.

Referring to FIG. 6, the apparatus receives, in block 601, a request for partial imaging results of the imaging target from a user device during the imaging of the imaging target. The user device may be connected to the apparatus via at least one wired and/or wireless communication network and/or via at least one wired and/or wireless communication link.

The apparatus transmits, in block 602, one or more most recently formed composite images or all formed composite images to the user device. The transmitting may be also performed during the imaging of the imaging target. Here, the composite images may be specifically (partial) composite images of different parts of the imaging target as discussed, e.g., in connection with block 308 of FIG. 3, FIG. 4 and block 508 of FIG. 5, as opposed to a complete composite image covering the whole imaging target. The transmitted composite image(s) may be retrieved from the database to which they may have been stored in block 207, 309, 509 of FIGS. 2, 3 and 5, respectively.

In some embodiments, the transmission of block 602 may, additionally or alternatively, comprise results of pairwise registration and/or results of partial alignment performed for the one or more most recently formed composite images or all formed composite images.

Figure 7:
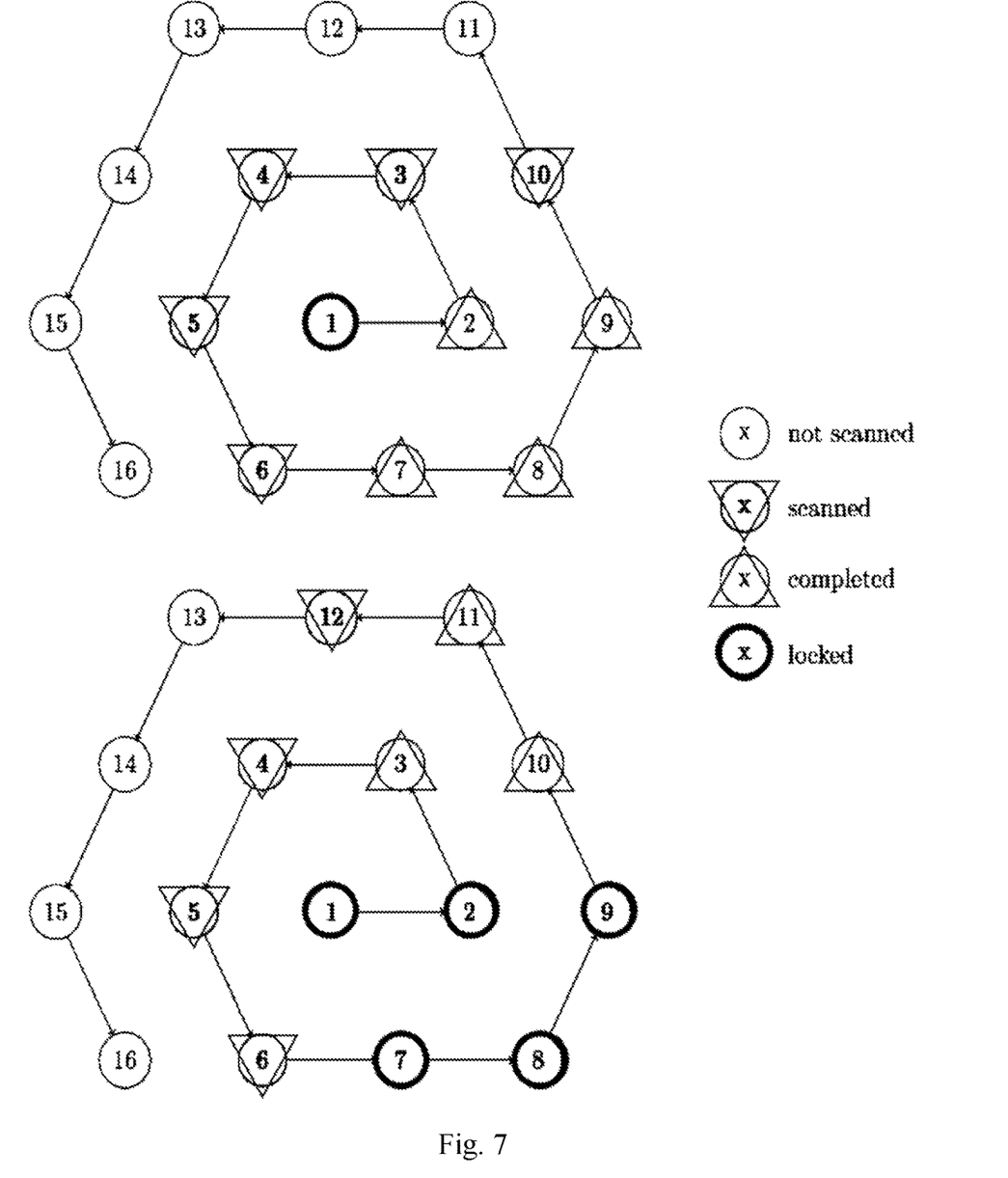

FIG. 7 illustrates an example of a scanning/stitching process according to some embodiments. Here, the scan comprises altogether a total of 16 individual images (denoted as images 1 to 16). The top and bottom parts of FIG. 7 illustrate two consecutive steps of the scanning/stitching process with the top part illustrating an earlier step and the bottom part illustrating a later step. In both parts of FIG. 7, arrows represent the scan path between images. The current status of each image (not scanned, scanned, completed or locked) is illustrated with different geometrical as shown in the legend of FIG. 7.

In the top part of FIG. 7, the scan is currently at image 10. The image 1 is locked from the beginning since it is the reference image. Images 2, 7, 8, and 9 are completed because all their neighboring images have already been scanned (the images 7, 8, and 9 lying on the boundary of the scan area). At this point, partial alignment is triggered for images 2 to 10.

The bottom part of FIG. 7 shows the situation following the partial alignment when the scan is at image 12. Following the partial alignment, the images 2, 7, 8 and 9 have become locked. The images 3, 10, and 11 have become completed. At this point, partial alignment is triggered for images 3 to 6 and 10 to 12. Following the partial alignment, the images 3, 10, and 11 become locked.

While the partial image stitching (or partial alignment) was discussed above as a variation of the basic image stitching process, in some embodiments, the partial image stitching (i.e., the pairwise registration and the partial alignment) as discussed above (e.g., in connection with block 306 of FIG. 3) may be combined with more advanced techniques for image stitching. For example, in some embodiments, the partial image stitching may correspond to multigraph-based partial image stitching. In multigraph-based partial image stitching, multiple candidate transformations $H_{ijk}$ and corresponding point correspondence sets between each pair of images under analysis are found in the pairwise registration phase (k being a candidate index). A so-called multigraph may be constructed based on the results of the multigraph-based pairwise registration. The multigraph comprises nodes representing nodal transformations from a composite image to the images of the at least three images, and edges between the nodes, where the edges represent the one or more candidate transformations. The edges may be associated with different edge weights indicating plausibility of the one or more candidate transformations. The partial alignment is, thereafter, performed for all the non-locked images while retaining all the candidates until both of the images in a pair become locked. Specifically, the partial alignment may comprise, in this case, solving edge weights $w_{ijk}$ and the nodal transformations $H_i$ by solving an optimization problem. Here, the optimization problem may be $$\min_{\{H_i\}} \sum_i \sum_j \sum_n w_{ij}^2 \|H_i x_{ij}^n - H_j x_{ji}^n\|^2, \quad (11)$$

where $w_{ij}$ is the largest weight for the edge ij (i.e., largest of $w_{ij1}, w_{ij2}, \ldots, w_{ijK}$ with $K_{ij}$ being the number of candidates for the edge ij) and the points $\{x_{ij}^n \leftrightarrow x_{ji}^n\}$ correspond to the feature points of the candidate transformation with the largest edge weight.

The blocks, related functions, and information exchanges described above by means of FIGS. 2, 3, 5 and 6 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 8:
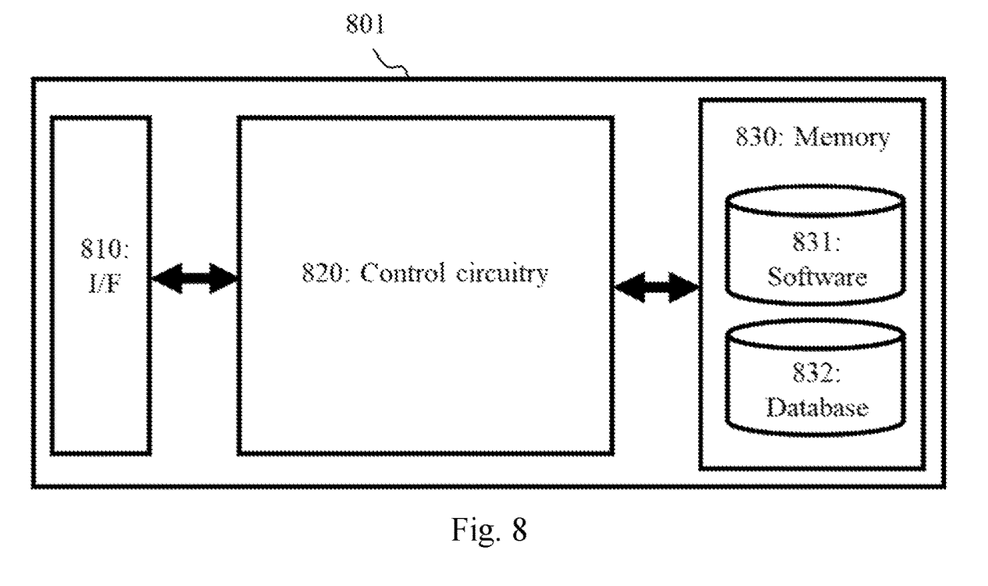
FIG. 8 illustrates an apparatus according to some embodiments.

FIG. 8 provides an apparatus 801 according to some embodiments. Specifically, the apparatus 801 may be an imaging device (equally called an image capture device) or a part (e.g., a computing device) of the imaging device. The apparatus 801 may be, e.g., an image capture device, or a device comprising at least one digital camera and/or at least one digital scanner, by which the individual images are captured. For example, the apparatus may be a scanning apparatus such as a digital microscope (slide) scanner, or a mobile phone such as a smartphone comprising one or more cameras or a tablet computer. Alternatively, the apparatus performing the method may be an external (computing) device (that is, a device external to the device performing the imaging) such as a computer or a server which may receive the images to be stitched, e.g. from an imaging device, from a database, or from a memory device.

The apparatus 801 may comprise one or more control circuitry 820, such as at least one processor, and at least one memory 830, including one or more algorithms 831 (instructions), such as a computer program code (software) wherein the at least one memory 830 and the computer program code (software) are configured, with the at least one processor, to cause the apparatus 801 to carry out any one of the exemplified functionalities of the apparatus described above. Said at least one memory 830 may also comprise at least one database 832.

When the one or more control circuitry 820 comprises more than one processor, the apparatus 801 may be a distributed device wherein processing of tasks takes place in more than one physical unit. Each of the at least one processor may comprise one or more processor cores. A processing core may comprise, for example, a Cortex-A8 processing core manufactured by ARM Holdings or a Zen processing core designed by Advanced Micro Devices Corporation. The one or more communication control circuitry 820 may comprise at least one Qualcomm Snapdragon and/or Intel Atom processor. The one or more communication control circuitry 820 may comprise at least one application-specific integrated circuit (ASIC). The one or more control circuitry 820 may comprise at least one field-programmable gate array (FPGA).

Referring to FIG. 8, the one or more communication control circuitry 820 of the apparatus 801 are configured to carry out functionalities described above by means of any of FIGS. 1 to 7 using one or more individual circuitries. It is also feasible to use specific integrated circuits, such as ASIC (Application Specific Integrated Circuit) or other components and devices for implementing the functionalities in accordance with different embodiments.

Referring to FIG. 8, the apparatus 801 may further comprise different interfaces 810 such as one or more communication interfaces comprising hardware and/or software for realizing communication connectivity according to one or more communication protocols. The one or more communication interfaces 810 may comprise, for example, communication interfaces providing a connection between the apparatus 801 and an external database and/or one or more user devices. The one or more communication interfaces 810 may also comprise, for example, communication interfaces providing a connection between the apparatus 801 and at least one display. Specifically when the apparatus 801 is a part (e.g., a computing device) of the imaging device (being, e.g., a digital microscope scanner), the one or more communication interfaces 810 may comprise, for example, communication interfaces providing a connection between the apparatus 801 and an imaging (or scanning) module of the imaging device.

The one or more communication interfaces 810 may comprise standard well-known components such as an amplifier, filter, frequency-converter, (de)modulator, and encoder/decoder circuitries, controlled by the corresponding controlling units, and one or more antennas. The apparatus 801 may also comprise one or more user interfaces.

Referring to FIG. 8, the memory 830 may be implemented using any suitable data storage technology, such as semiconductor based memory devices, flash memory, magnetic memory devices and systems, optical memory devices and systems, fixed memory and removable memory.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hard-ware circuit or processor (or multiple processors) or a portion of a hardware circuit or processor and its (or their) accompanying software and/or firmware.

In an embodiment, at least some of the processes described in connection with FIGS. 2 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, random-access memory (RAM), read-only memory (ROM), software, firmware, display, user interface, display circuitry, user interface circuitry, user interface software, display software, circuit, filter (low-pass, high-pass, bandpass and/or bandstop), sensor, circuitry, inverter, capacitor, inductor, resistor, operational amplifier, diode and transistor. In an embodiment, the at least one processor, the memory, and the computer program code form processing means or comprises one or more computer program code portions for carrying out one or more operations according to any one of the embodiments of FIGS. 2 to 7 or operations thereof. In some embodiments, at least some of the processes may be implemented using discrete components.

According to an embodiment, there is provided an apparatus (e.g., an imaging device or a part thereof) comprising means for performing:
- obtaining, periodically or regularly during imaging of an imaging target, images of different areas of the imaging target, wherein at least some of the images overlap partially with each other;
- in response to detecting, during the obtaining, that an image and all images partially overlapping with said image have been obtained, marking the image as completed; and
- in response to detecting, during the obtaining, that a pre-defined number of images are marked as completed while not being defined as locked, executing a partial image stitching process comprising:
  - performing image stitching on non-locked images based on at least some or all of images obtained this far,
  - locking, following the image stitching, stitched completed images for preventing changing of the stitched completed images during subsequent image stitching rounds and
  - performing one or more actions comprising at least one of:
    - outputting image information comprising at least information on most recently locked images via at least one interface or
    - storing the image information comprising at least the information on the most recently locked images to a database accessible by a user device and/or by an analysis device.

Embodiments as described may also be carried out, fully or at least in part, in the form of a computer process defined by a computer program or portions thereof. Embodiments of the methods described in connection with FIGS. 2 to 8 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

The term "non-transitory", as used herein, is a limitation of the medium itself (that is, tangible, not a signal) as opposed to a limitation on data storage persistency (for example, RAM vs. ROM).

Reference throughout this specification to one embodiment or an embodiment means that a particular feature, structure, or characteristic described in connection with the embodiment is included in at least one embodiment of the present solution. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present solution may be referred to herein along with alternatives for the various components thereof. It is understood that such embodiments, examples, and alternatives are not to be construed as de facto equivalents of one another, but are to be considered as separate and autonomous representations of the present solution.

Even though embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

INDUSTRIAL APPLICABILITY

Embodiments find industrial application in image processing, especially in stitching of images.

The invention claimed is:

1. An apparatus comprising:
at least one processor; and
at least one memory storing instructions that, when executed by the at least one processor, cause the apparatus at least to perform:
obtaining, periodically or regularly during imaging of an imaging target, images of different areas of the imaging target, wherein at least some of the images overlap partially with each other;
in response to detecting, during the periodical or regular obtaining of the images of the different areas of the imaging target, that an image and all images partially overlapping with said image have been obtained, marking the image as completed; and
in response to detecting, during the periodical or regular obtaining of the images of the different areas of the imaging target, that a pre-defined number of images are marked as completed while not being defined as locked, executing a partial image stitching process, wherein images defined as locked are images whose transformations from a composite image to individual images are fixed, and the pre-defined number of images is equal to or smaller than a half of the total number of images for fully imaging the imaging target, the partial image stitching process comprising:
performing image stitching on non-locked images based on at least some or all of images obtained this far to at least form transformations from a composite image to the completed images,
locking, following the image stitching, stitched completed images, wherein the locking comprises fixing the formed transformations for the stitched completed images for preventing changing them during subsequent image stitching rounds, and
performing one or more actions comprising at least one of:
outputting image information comprising at least information on most recently locked images via at least one interface or
storing the image information comprising at least the information on the most recently locked images to a database accessible by a user device and/or by an analysis device.

2. The apparatus of claim 1, wherein either
the at least one memory and the instructions are configured, with the at least one processor, to cause the apparatus to:
perform, during the obtaining of the images, pairwise registration for the images as they are obtained, and
the performing of the image stitching on the non-locked images comprises:
performing alignment for the non-locked images based on results of the pairwise registration for said at least some or all of images obtained this far, or
the performing of the image stitching on the non-locked images comprises:
performing pairwise registration for said at least some of non-locked images obtained this far; and
performing alignment for the non-locked images based on results of the pairwise registration for said at least some or all of images obtained this far to at least form the transformations from the composite image to the completed images,
wherein the partial image stitching process further comprises:
forming, following the locking, at least one composite image depicting at least one part of the imaging target based, fully or at least in part, on results of the pairwise registration and results of the alignment for the most recently locked images of the imaging target; and
including at least the at least one composite image in the outputted and/or stored image information.

3. The apparatus of claim 2, wherein the at least one memory and the instructions are configured, with the at least one processor, to cause the apparatus to perform, during the obtaining:
receiving a request for partial imaging results of the imaging target from the user device; and
transmitting one or more most recently formed composite images or all formed composite images to the user device.

4. The apparatus of claim 1, wherein the performing of the image stitching is based on all images of the imaging target obtained this far comprising any available non-completed non-locked images of the imaging target, any available completed non-locked images of the imaging target, any available non-completed locked images of the imaging target and any available completed locked images of the imaging target.

5. The apparatus of claim 1, wherein the at least one memory and the instructions are configured, with the at least one processor, to cause the apparatus to execute the partial image stitching process also in response to detecting a completion of the imaging of the imaging target.

6. The apparatus of claim 1, wherein the at least one memory and the instructions are configured, with the at least one processor, to cause the apparatus to perform the detecting that an image and all images partially overlapping with said image have been obtained based on a pre-defined imaging area defined for the imaging of the imaging target.

7. The apparatus of claim 1, wherein the at least one memory and the instructions are configured, with the at least one processor, to cause the apparatus to perform:
in response to obtaining an initial image of the imaging target, defining the initial image as locked.

8. The apparatus of claim 1, wherein the one or more actions comprise at least the outputting via the at least one interface, the at least one interface comprising:
- an interface for connecting to the Internet; and/or
- a user interface for displaying the image information to the user via a display of the apparatus or a display communicatively connected to the apparatus and/or
- an interface for connecting to a local or remote server for further analyzing the image information.

9. The apparatus of claim 1, wherein the one or more actions comprise at least the storing and the database is a database accessible via at least one wired and/or wireless communication network and/or via at least one wired and/or wireless communication link.

10. The apparatus of claim 1, wherein the apparatus is an imaging device.

11. The apparatus of claim 10, wherein the obtaining of the images comprises:
- taking the images of the imaging target.

12. The apparatus of claim 1, wherein the apparatus is a microscope slide scanner and the imaging target is a slide or a part thereof.

13. The apparatus of claim 12, wherein the obtaining of the images comprises:
- when the slide is inserted into the microscope slide scanner, scanning sequentially a plurality of pre-defined scanning subareas to form the images of the different areas of the slide, wherein the plurality of scanning subareas overlap partially and form together a scanning area of the microscope slide scanner.

14. The apparatus of claim 1, wherein the apparatus is a computing device.

15. The apparatus of claim 14, wherein the obtaining of the images comprises:
- receiving images periodically or regularly via at least one wired and/or wireless communication network and/or via at least one wired and/or wireless communication link from an imaging device.

16. The apparatus of claim 1, wherein the at least one memory and the instructions are configured, with the at least one processor, to cause the apparatus to:
- perform, during the obtaining of the images, pairwise registration for the images as they are obtained, wherein the performing of the image stitching on the non-locked images comprises:
  - performing alignment for the non-locked images based on results of the pairwise registration for said at least some or all of images obtained this far.

17. The apparatus of claim 1, wherein the performing of the image stitching on the non-locked images comprises:
- performing pairwise registration for said at least some of non-locked images obtained this far; and
- performing alignment for the non-locked images based on results of the pairwise registration for said at least some or all of images obtained this far.

18. A method comprising:
- obtaining, periodically or regularly during imaging of an imaging target, images of different areas of the imaging target, wherein at least some of the images overlap partially with each other;
- in response to detecting, during the periodical or regular obtaining of the images of the different areas of the imaging target, that an image and all images partially overlapping with said image have been obtained, marking the image as completed; and
- in response to detecting, during the periodical or regular obtaining of the images of the different areas of the imaging target, that a pre-defined number of images are marked as completed while not being defined as locked, executing a partial image stitching process, wherein images defined as locked are images whose transformations from a composite image to individual images are fixed, and the pre-defined number of images is equal to or smaller than a half of the total number of images for fully imaging the imaging target, the partial image stitching process comprising:
  - performing image stitching on non-locked images based on at least some or all of images obtained this far to at least form transformations from a composite image to the completed images,
  - locking, following the image stitching, stitched completed images, wherein the locking comprises fixing the formed transformations for the stitched completed images for preventing changing them during subsequent image stitching rounds, and
  - performing one or more actions comprising at least one of:
    - outputting image information comprising at least most recently locked images via at least one interface or
    - storing the image information comprising at least the most recently locked images to an internal database accessible by a user and/or by an analysis device.

19. A non-transitory computer readable medium having stored thereon instructions that, when executed by a computing device, cause the computing device to perform:
- obtaining, periodically or regularly during imaging of an imaging target, images of different areas of the imaging target, wherein at least some of the images overlap partially with each other;
- in response to detecting, during the periodical or regular obtaining of the images of the different areas of the imaging target, that an image and all images partially overlapping with said image have been obtained, marking the image as completed; and
- in response to detecting, during the periodical or regular obtaining of the images of the different areas of the imaging target, that a pre-defined number of images are marked as completed while not being defined as locked, executing a partial image stitching process, wherein images defined as locked are images whose transformations from a composite image to individual images are fixed, and the pre-defined number of images is equal to or smaller than a half of the total number of images for fully imaging the imaging target, the partial image stitching process comprising:
  - performing image stitching on non-locked images based on at least some or all of images obtained this far to at least form transformations from a composite image to the completed images,
  - locking, following the image stitching, stitched completed images wherein the locking comprises fixing the formed transformations for the stitched completed images for preventing changing them during subsequent image stitching rounds, and
  - performing one or more actions comprising at least one of:
    - outputting image information comprising at least most recently locked images via at least one interface or storing the image information comprising at least the most recently locked images to an internal database accessible by a user and/or by an analysis device.

* * * * *